United States Patent
Nakamura et al.

[11] Patent Number: 6,013,205
[45] Date of Patent: Jan. 11, 2000

[54] METHOD AND APPARATUS FOR MANUFACTURING DISTRIBUTED REFRACTIVE INDEX PLASTIC OPTICAL-FIBER

[75] Inventors: Tetsuya Nakamura; Hayato Yuuki, both of Yokkaichi, Japan

[73] Assignee: Sumitomo Wiring Systems, Ltd., Yokkaichi, Japan

[21] Appl. No.: 09/035,851

[22] Filed: Mar. 6, 1998

[30] Foreign Application Priority Data

Mar. 7, 1997 [JP] Japan ................................ 9-52978

[51] Int. Cl.$^7$ ........................................ B29D 11/00
[52] U.S. Cl. ................ 264/1.27; 264/1.29; 264/444; 425/71; 425/72.2; 425/174.2
[58] Field of Search .................. 264/1.1, 1.24, 264/1.29, 1.7; 425/72.2, 71, 377, 174.2

[56] References Cited

U.S. PATENT DOCUMENTS

| | | |
|---|---|---|
| 3,718,383 | 2/1973 | Moore . |
| 3,955,015 | 5/1976 | Ohtsuka et al. . |
| 3,999,834 | 12/1976 | Ohtomo et al. . |
| 5,541,247 | 7/1996 | Koike . |
| 5,593,621 | 1/1997 | Koike et al. ............... 264/1.29 |
| 5,614,253 | 3/1997 | Nonaka et al. . |
| 5,639,512 | 6/1997 | Nonaka et al. . |

FOREIGN PATENT DOCUMENTS

| | | |
|---|---|---|
| 6186442 | 7/1984 | Japan . |
| 63-218903 | 9/1988 | Japan . |
| 5-60931 | 3/1993 | Japan . |
| 7-13029 | 1/1995 | Japan . |
| 7-27928 | 1/1995 | Japan . |
| 7-5329 | 1/1995 | Japan . |
| 9-218311 | 8/1997 | Japan . |
| 9218312 | 8/1997 | Japan . |

*Primary Examiner*—Mathieu D. Vargot
*Attorney, Agent, or Firm*—Greenblum & Bernstein, P.L.C.

[57] ABSTRACT

A plastic optical fiber is provided with a desired length and with a desired graded refractive index. To this end, a base polymer is first mixed with a non-polymerizable compound having a higher refractive index to obtain a fiber material. This material is then melted and continually spun into a fiber. The fiber is dipped into a polymerizable monomer and heated, during which both the non-polymerizable monomer and the polymerizable monomer diffuse inside the fiber, thereby grading the refractive index. When the fiber is heated, the diffused polymerizable monomer is polymerized and the fiber is hardened. The fiber is further coated with a cladding to form the desired plastic optical fiber. Various devices are provided for carrying out the above described processes.

16 Claims, 10 Drawing Sheets

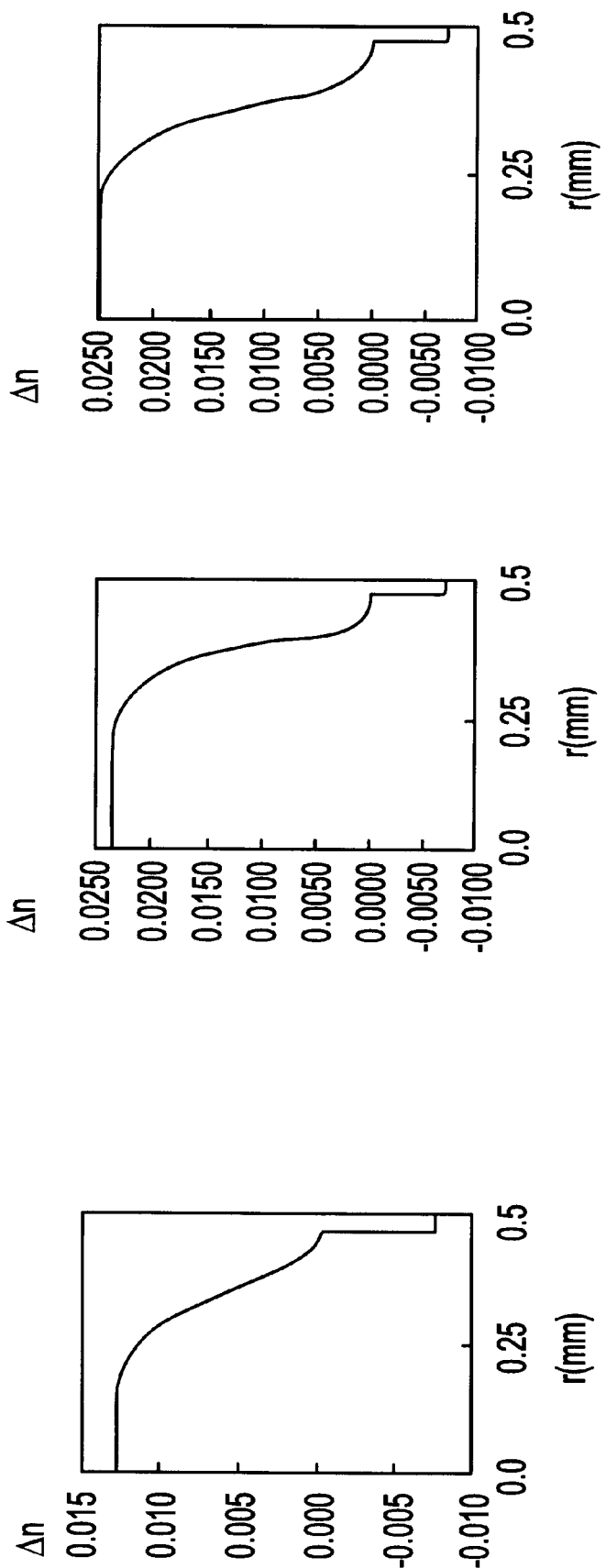

METHOD AND APPARATUS FOR MANUFACTURING DISTRIBUTED REFRACTIVE INDEX PLASTIC OPTICAL-FIBER

BACKGROUND OF THE INVENTION

1. Field of the Invention

The present invention relates to a method for manufacturing of a graded index type plastic optical fiber and a manufacturing apparatus therefor.

2. Description of Background Information

In order to manufacture this type of plastic optical fiber, several methods have been disclosed, for example, in Japanese Published Patent Applications Nos.HEI 5-507610 and HEI 7-27928.

According to the method described in Application No. HEI 5-507610, a cladding is formed of a cylindrical tube having a hollow central part which is filled with a liquid mixture including a monomer and a compound having a high refractive index. The liquid mixture is then heated or irradiated with energy-carrying rays, thereby generating and propagating a polymerization reaction, preferentially on a predetermined site. The compound having a high refractive index thus forms a density gradient and is used as base material. The base material is melted by heating and is elongated so as to vary its refractive index continuously in the radial direction. This base material constitutes the core part of the plastic optical fiber.

In the method disclosed in Application No. HEI 7-27928, a polymerized fiber material is melted by heating and spun to form a fiber. The fiber thus obtained is soaked into a solution containing a non-polymerizable compound having a refractive index lower than that of the initial polymer, whereby this non-polymerizable compound is impregnated and diffused inside the fibers. Thus, a plastic optical fiber having a graded refractive index is obtained.

However, in the method disclosed in Application No. HEI 5-507610, the fiber is formed by heating, fusing and drawing the base material. The length of the fiber which can be produced from one base material is thus limited, i.e., the fiber length depends on the size of the base material.

In order to manufacture a longer fiber, the base material must have a greater diameter or must be of a longer size. When the base material is thickened, the subsequent drawing process becomes difficult because of insufficient heating and fusing. When the base material is lengthened, the material should have a uniform graded index and constant transmission loss in the longitudinal direction. However, the manufacture of such a material requires stringent conditions to be satisfied for controlling the reactions and polymerization. When manufacturing a plastic optical fiber having a length over 1,000 m and a diameter of 1 mm, a one-meter base material would have to have a diameter over 30 m.

Further, this method is a batch system in which a base material is first prepared, drawn and transformed into an optical fiber. The running ratio of the process therefore is not good and, as the production increases, the manufacturing facilities must be scaled up greatly.

In the method disclosed in Application No. HEI 7-27928, the fiber is manufactured continuously, so that it can be made with a desired length. However, after the fiber is manufactured, it has to enable a non-polymerizable compound to diffuse from its surface inwards. A large molecular-size, low refractive-index compound is, however, difficult to diffuse into such a fiber, so that the refractive index is poorly graded.

In order to diffuse a large molecular-size, low refractive-index compound into the fiber, the compound and the fiber must be heated to a high temperature. However, strong heating tends to melt and cut the fiber, and the fiber manufacturing becomes inconsistent.

In view of the above, an object of the present invention is to provide a novel method of manufacturing a graded-index type plastic optical fiber and a manufacturing apparatus therefor. This method attains a good running ratio of the process and minimizes the scaling-up of installation required for production increase. Further, the plastic optical fiber is easily provided with a desired graded index. Moreover, the graded-index fiber can be manufactured, continuously and constantly, in a desired length with a constant quality.

SUMMARY OF THE INVENTION

To this end, there is provided a method of manufacturing a graded refractive-index type plastic optical-fiber. This method includes:

a) preparing a base polymer, a non-polymerizable compound having a refractive index higher than that of the base polymer, and a polymerizable compound which is diffusible in the polymer;

b) mixing the base polymer and the non-polymerizable compound, thereby obtaining a fiber material;

c) melting and spinning the fiber material, thereby obtaining a fiber having a center portion and a periphery;

d) dipping the fiber in the polymerizable compound, whereby the non-polymerizable compound and the polymerizable compound diffuse inside the fiber; and e) heating the fiber, whereby the polymerizable compound is polymerized and the refractive index is graded decreasingly from the center portion to periphery.

The fiber material may be formed by:

a) mixing one or a plurality of first monomers and a non-polymerizable compound;

b) polymerizing the first monomer or monomers, thereby obtaining the base polymer mixed with the non-polymerizable compound; and c) pelletizing the base polymer, thereby obtaining the fiber material.

Further, an operation d) may be carried out by imparting ultrasonic vibrations.

In the above method, the base polymer may be formed from at least one monomer chosen from the group consisting of acrylates, methacrylates, styrene-based compounds, fluoroacrylates and fluoromethacrylates.

Also, the non-polymerizable compound may be at least one compound chosen from the group including hexyl acetate, benzyl benzoate, bis-(2-methylhexyl) phthalate, dibutyl sebacate, dihexyl adipate, dimethyl phthalate and diphenyl sulfide.

Preferably, the non-polymerizable compound has a refractive index higher than that of the base polymer by at least 0.02.

Preferably still, the polymerizable monomer is the same monomer as the one which constitutes the base polymer.

The method described above may further include:

e) drawing the fiber, thereby obtaining an orientation in the fiber; and f) forming a cladding around the fiber.

In this method, the operation f) may be carried out by dipping the fiber in a second monomer susceptible to producing a polymer having a refractive index lower than that of the fiber material, thereby obtaining the fiber covered with the second monomer, and polymerizing the second monomer, thereby forming the cladding.

The second monomer may be chosen from the group including fluoroacrylates and fluoromethacrylates.

Likewise, the operation f) may be carried out by:

1) preparing a solution of a third monomer containing a polymer derived from the third monomer and having a refractive index lower than that of the fiber material;

2) dipping the fiber into the solution, thereby obtaining the fiber covered with the solution; and 3) polymerizing the third monomer, thereby forming the cladding.

The operation f) may also be carried out by:

1) preparing a solvent containing a polymer having a refractive index lower than that of the fiber material;

2) dipping the fiber into the solvent, thereby obtaining the fiber covered with the solvent; and 3) evaporating the solvent, thereby forming the cladding.

The invention also provides an apparatus for manufacturing a graded refractive-index type, plastic optical-fiber. The apparatus includes:

a) a fiber-preparing mechanism including a unit for mixing a base polymer and a non-polymerizable compound having a higher refractive index than that of the base polymer to obtain a fiber material, a unit for heating and melting the fiber material to obtain a melt, and a unit for spinning the melt to continuously form a fiber;

b) a diffusion device including a container unit for containing a polymerizable compound which is diffusible in the fiber and a handling unit for passing said fiber leaving the fiber-preparing mechanism continuously into and through the container unit; and c) a curing unit for polymerizing the polymerizable compound.

In the above apparatus, the handling unit may include a feed mechanism for continuously feeding the fiber into the container unit and a withdrawing mechanism for withdrawing the fiber therefrom, such that the fiber retains a portion hanging loosely between the feed and withdrawing mechanism and such that the hanging portion is dipped in and passed through the polymerizable compound.

The handling unit may also include a pair of feed mechanisms positioned such that a portion of the fiber hangs loosely therebetween.

The feed mechanism may further include a guide unit for rotating the hanging portion, such that the hanging portion forms loops inside the polymerizable compound and such that the withdrawing mechanism withdraws the hanging portion therefrom before it reaches the bottom of the diffusion device.

The base polymer of the invention includes a non-crystalline high-molecular size substance, such as poly (methyl methacrylate), polystyrene, polycarbonate, or the like. Preferably, this base polymer gets only a small transmission loss due to dispersion and absorption in the wavelength range of the light source used.

To obtain such a polymer, a monomer belonging to a group such as (meth)acrylates, styrene-based compounds, fluoroacrylates, fluoromethacrylates, or the like, may be used.

Examples of each monomer group are described hereinafter:

(a) methacrylates and acrylates:
methyl methacrylate, ethyl methacrylate, isopropyl methacrylate, t-butyl methacrylate, benzyl methacrylate, phenyl methacrylate, cyclohexyl methacrylate, diphenylmethyl methacrylate, ethyl acrylate, methyl acrylate, n-butyl acrylate, etc.;

(b) styrene-based compounds:
styrene, α-methylstyrene, chlorostyrene, bromostyrene, dichlorostyrene, dibromostyrene, etc.;

(c) fluoroacrylates:
2,2,2-trifluoroethylacrylate, etc.;

(d) fluoromethacrylates:
1,1,2-trifluoroethyl methacrylate, etc.

In order to prepare the fiber material of the invention, any one of the above-mentioned monomers may be used to form a polymer, which is subsequently used for that purpose. A plurality of monomers may also be used to form a co-polymer for the same purpose.

The fiber material also contains a non-polymerizable compound. This compound preferably has a refractive index higher than that of the above polymer by at least 0.02, a good compatibility with the polymer and its monomers, and a high boiling temperature exceeding 200° C.

Examples of the non-polymerizable compound include hexyl acetate, benzyl benzoate, bis(2-methylhexyl) phthalate, a sebacic acid ester such as dibutyl sebacate, an adipate such as dihexyl adipate, dimethyl phthalate, diphenyl sulfide, and the like. Preferably, one or more compounds are used in combination, according to the refractive index of the base polymer.

The solution used in the diffusion vat may contain any compound which has a small molecular size or a low molecular weight and is diffusible inside the polymer used for the fiber. The compound is preferably a polymerizable compound, e.g., a monomer, more preferably the monomer constituting the polymer used for the fiber.

Examples of the monomers used in the cladding-forming solution include any monomer which forms a polymer having a lower refractive index than that of the fiber core. The polymer thus formed is preferably more transparent than the fiber core. For example, when the core part is formed by mixing poly(methyl methacrylate), i.e., PMMA, with a non-polymerizable compound having a high refractive index, monomer methyl methacrylate (MMA) may be used for the cladding.

As monomers used for cladding formation, fluoro-type monomers as follow may be used:

(a) fluoroacrylates:
2,2,2-trifluoroethylacrylate, 2,2,3,3-tetrafluoropropylacrylate, etc.;

(b) fluoromethacrylates:
1,1,2-trifluoroethylemthacrylate, 2,2,3,3-tetrafluoropropylmethacrylate, etc.

As an example of the solution which dissolves the polymer used for cladding in the monomer constituting the same polymer, a solution of PMMA in monomer MMA and that of an acrylate-group polymer in its monomer, etc. can be used.

Examples of the solution, prepared by dissolving a polymer for cladding in a solvent, are as follows:

(a) a solution of PMMA dissolved in tetrahydrofuran (THF) or the like, a solution of an acrylate-group polymer dissolved in tetrahydrofuran (THF) or the like;

(b) a solution of poly(vinylidene fluoride) dissolved in dimethylacetamide or the like, a solution of fluoro-type poly(polyolefin) such as poly(vinylidene fluoride) dissolved in a solvent;

(c) a solution of poly (2,2,2-trifluoroethylmethacrylate) dissolved in THF or the like, a solution of fluoromethacrylate or fluoroacrylate dissolved in a solvent or in the corresponding monomer.

Likewise, fluoro-type poly(polyolefin) such as poly (vinylidene fluoride) may be melted by heat and used a solution for cladding.

BRIEF DESCRIPTION OF THE DRAWINGS

The above and other objects, features and advantages of the present invention will be made apparent from the following description of the preferred embodiments, given as non-limiting examples, with reference to the accompanying drawings, in which:

FIGS. 13(a), (b) and (c) show the distribution of a graded refractive-index in the plastic optical fiber of a first, second and third comparative example, respectively.

DETAILED DESCRIPTION OF THE PREFERRED EMBODIMENTS

Figure 1:
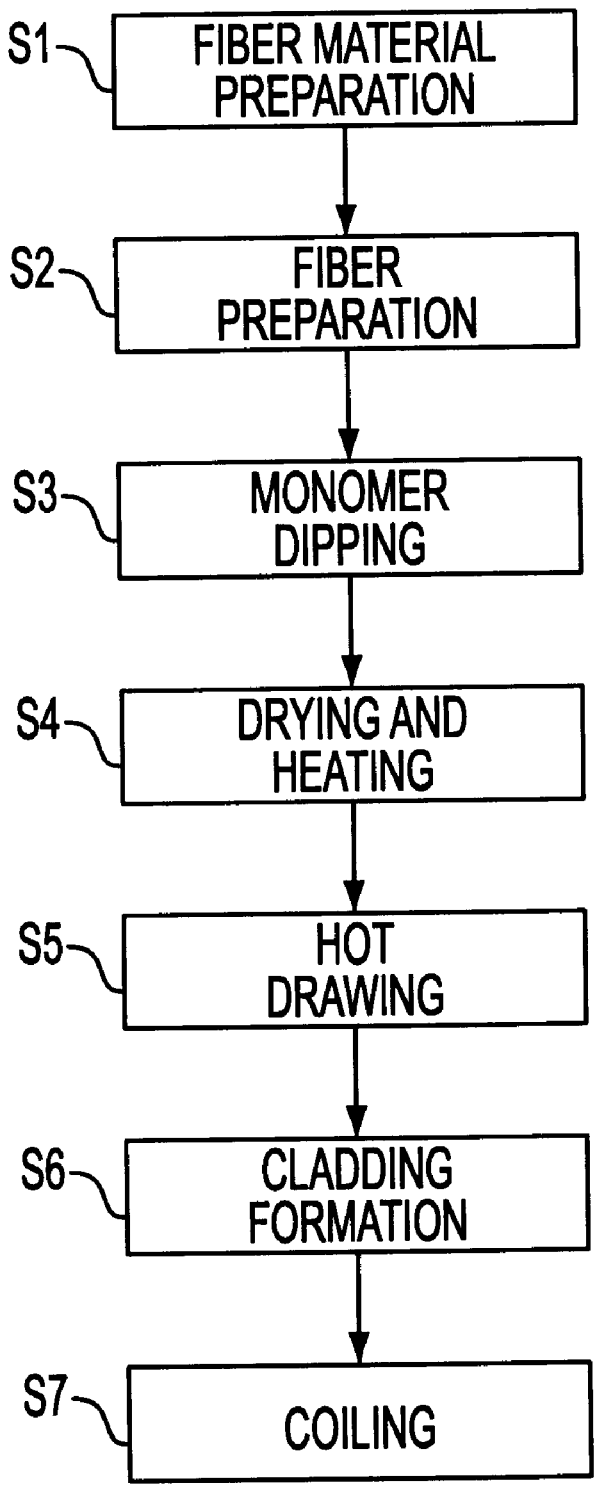
FIG. 1 shows a flow chart of the manufacturing method of a graded refractive-index type plastic optical fiber, according to a first embodiment of the invention.
Figure 2:
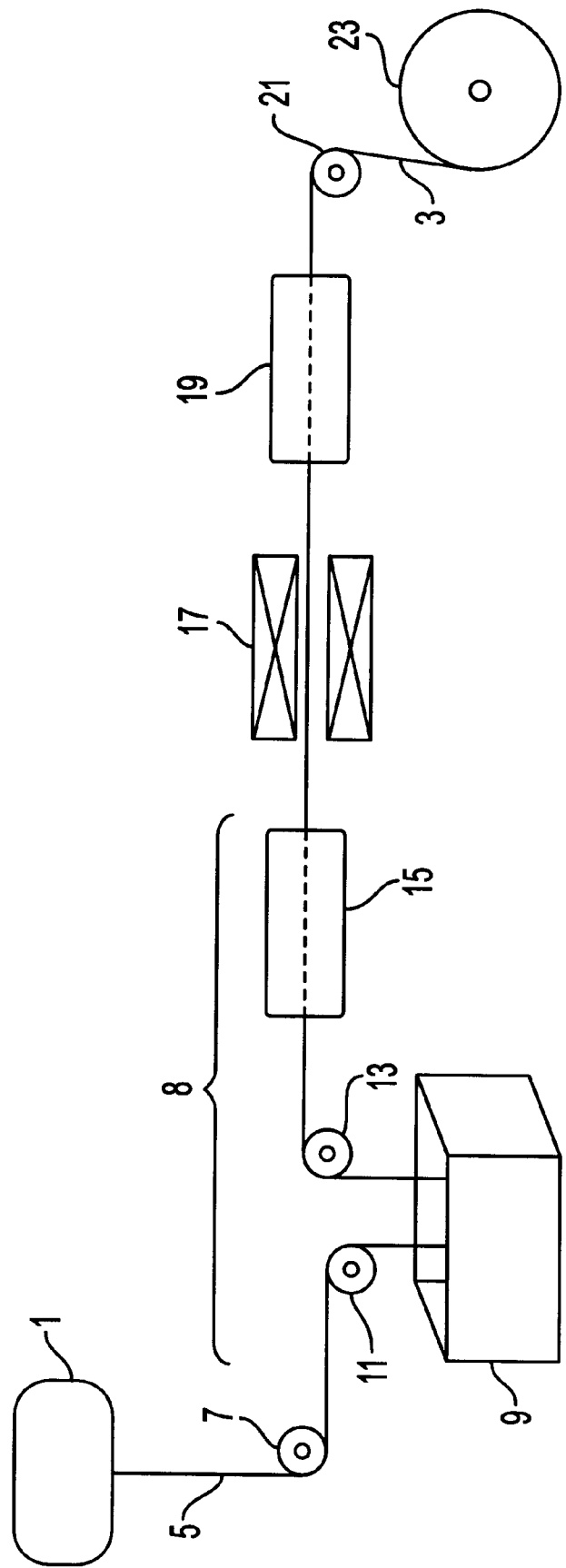
FIG. 2 shows an apparatus for manufacturing the graded refractive-index type fiber of the first embodiment.

FIG. 1 is a flow chart showing the manufacturing process of a graded-index type plastic optical fiber according to a first embodiment, and FIG. 2 shows the structure of the manufacturing apparatus used for this process.

A fiber material is prepared in fiber-material preparing step (step S1). In this step, a monomer, or a mixture of a plurality of monomers, is mixed with a non-polymerizable compound having a higher refractive index than the polymer which is to be produced from the aforementioned monomers. The mixture is heated under stirring to give a hardened polymer. The latter is crushed and pelletized. Polymerization is controlled so as to obtain an average molecular weight of 100,000 to 200,000, preferably 130,000 to 150,000.

Figure 3:
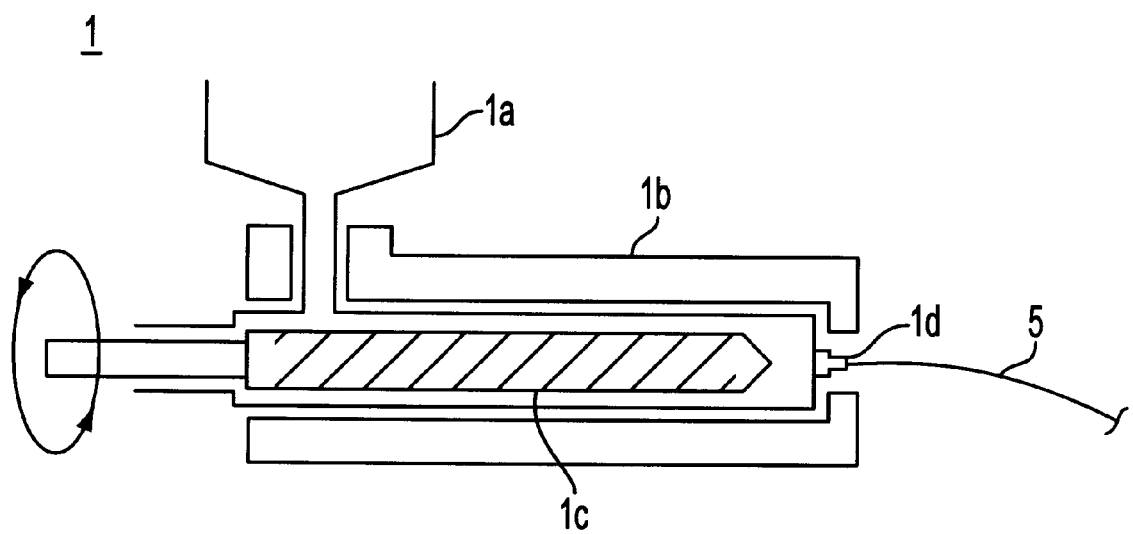
FIG. 3 illustrates a fiber-preparing unit shown in the apparatus of FIG. 2.

The pelletized fiber material is fed into a fiber-forming unit 1. This unit is shown in FIG. 3. The fiber material is supplied from a hopper 1a in a pelletized state. It is then heated and melted by a heater 1b, kneaded by a screw 1c, and spun out from the die point 1d to form a fiber. In this manner, the fiber 5, which forms subsequently the core part of the plastic optical fiber 3, is manufactured continuously (step S2).

The fiber 5 thus manufactured in fiber-forming unit 1 is subsequently fed into refractive-index grading unit 8 via a turn roller 7, to form an appropriate distribution of the index. This unit 8 includes a diffusion vat 9 filled with a monomer, a feed roller 11 and an exit roller 13 as a transport mechanism, and a drying and heating unit 15.

The fiber 5 leaving fiber-forming unit 1 is subsequently fed into diffusion vat 9 via feed roller 11 and is soaked in the monomer solution contained therein (step S3). By soaking fiber 5 in the monomer for a predetermined time, the fiber 5 swells with the monomer. In this process, the high refractive-index, non-polymerizable compound which is preliminarily incorporated in the fiber 5 and the monomer are diffused mutually inside the fiber. The non-polymerizable compound thus forms density distribution inside the fiber 5, so that the refractive index decreases proportionally to the square of the distance from the center of fiber 5.

The fiber 5 fed into diffusion vat 9 is pulled up therefrom continuously via exit roller 13. It is then led to a drying and heating unit 15, where the monomer, either diffused inside the fiber 5 or adhered on the surface thereof, is polymerized and hardened (step S4). The drying and heating unit 15 is provided, for example, with a cylindrical heater. When the fiber 5 is passed through a hollow part of the heater where warm air is blown, the fiber is dried and heated.

After passing through the drying and heating unit 15, fiber 5 is led to a drawing unit 17 where the fiber is drawn under heating. The fiber 5 after dipping has no oriented structure. This drawing procedure confers upon the fiber 5 an appropriate orientation and a mechanical strength (step S5).

The hot-drawn fiber 5 is then sent to a cladding unit 19 to form a cladding (step S6). The cladding is formed by extruding a resin on the outer surface of the continuously delivered fiber 5. The resin to be used is a transparent resin having a refractive index lower than that of the core, i.e., fiber material constituting fiber 5.

Thus, after proceeding successively through a diffusion vat 9, a drying and heating unit 15, drawing unit 17 and a cladding unit 19, the fiber 5 is transformed into a plastic optical fiber 3. The fiber 3 is then sent to a turn roller 21 and reeled continuously on a coiler 23 (step S7).

Once reeled on coiler 23, the plastic optical fiber 3 is uncoiled and coated with polyethylene, poly(vinylchloride) or the like, to obtain an optical fiber cord or cable.

According to the invention, a plastic optical fiber is manufactured continuously and not by batch system. The process is therefore performed with a high running ratio which minimizes the necessity of scaling-up of the facilities, even though the production is to be increased, and which allows obtaining a graded-index type plastic optical fiber with a desired length.

As a high refractive index, non-polymerizable compound is mixed beforehand with the base polymer of fiber 5, the glass-transition temperature of the polymer is lowered and its solubility into monomer is increased. As such, when fiber 5 is soaked in the monomer, the fiber 5 is easily impregnated with the monomer without heating to a high temperature. This allows an easy and rapid diffusion of the non-polymerizable compound inside the fiber 5. Thus, the grading of the refractive index is easily performed. Moreover, the process enables avoiding the melting off of the fiber 5, which is caused when it is heated at a high temperature as described in published Japanese Application HEI 7-27928, and produces the plastic optical fiber 3 in a constant manner.

Further, the monomer used in the diffusion vat 9 has a small molecular size, so that it can diffuse easily inside the fiber 5. Accordingly, the refractive index can be graded easily.

The fiber material 5 for forming fiber 5 is pelletized, melted by heating, kneaded and spun. The material is completely homogenized by kneading in fiber-forming unit 1. Therefore, even if the fiber material before pelletizing was not homogeneous, a plastic optical fiber 3 obtained is thoroughly uniform.

Further, the plastic optical fiber 3 is coated with a cladding. This suppresses the increase of optical loss caused by the flexion of the optical fiber 3.

In this first embodiment, the cladding-formation step (S6) is performed after the hot drawing step (S5), but the latter may be performed prior to the hot drawing step (S5).

Figure 4:
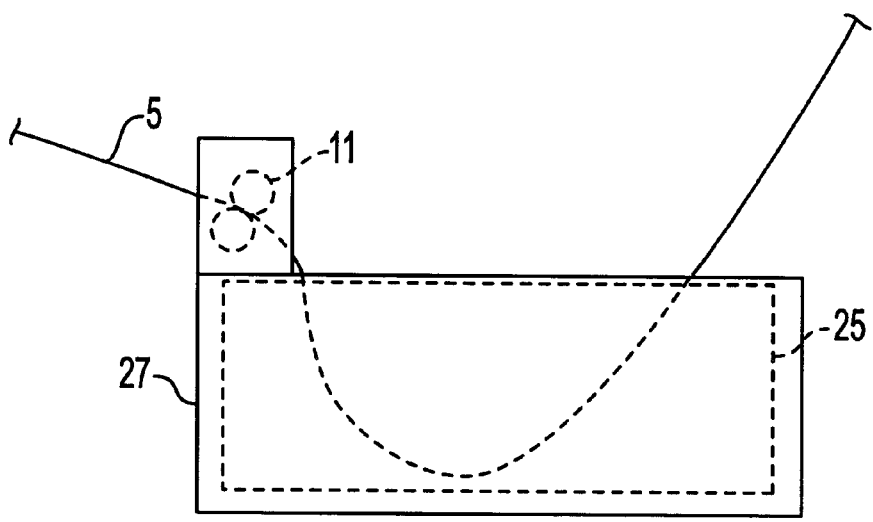
FIG. 4 illustrates a diffusion vat provided for the apparatus for manufacturing a graded refractive-index type plastic optical fiber, according to a second embodiment of the invention.

The apparatus for manufacturing a graded refractive-index, plastic optical fiber according to a second embodiment has a diffusion vat as shown in FIG. 4. This embodiment differs from the first in that, in the dipping step into the monomer (S3), a diffusion vat 27, which is equipped with a device for imparting ultra-sound into the monomer 25, is used instead of diffusion vat 9. The other processes are the same as in the first embodiment and are not described.

The diffusion vat 27 is extended along the advancing direction of fiber. At an open side of the vat, a feed roller 11 is provided for feeding a continuously entering fiber 5 into the diffusion vat 27. The monomer 25 in the vat 27 is imparted with ultra-sound having a frequency of 40 kHz and an output electrical force of 100 W.

This embodiment provides the same effect as the first embodiment. In addition, by imparting ultrasonic vibrations into the monomer 25 when the fiber 5 is soaked therein, the non-polymerizable compound and the monomer 25 are diffused more rapidly and homogeneously in the fiber 5. The plastic optical fiber 3 thus obtained has a better and more constant quality, especially in the longitudinal direction.

Further, by varying the imparting conditions of ultra-sound (duration and amplitude), the diffusion can be controlled easily.

Figure 5:
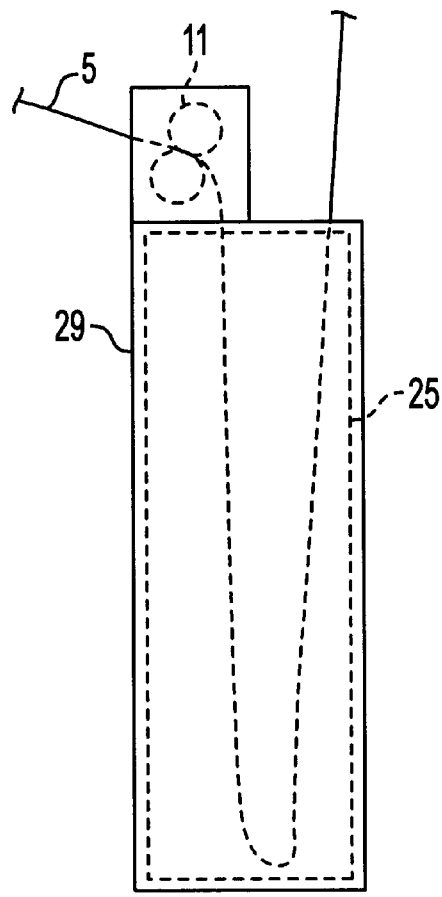
FIG. 5 illustrates a variation of the diffusion vat of the second embodiment.

FIG. 5 illustrates a variation of diffusion vat 27 shown in FIG. 4. Diffusion vat 29 in FIG. 5 is extended in the vertical direction and has an increased interior volume, so that fiber 5 is soaked into monomer 25 in a longer range. The monomer 25 in the diffusion vat 29 is imparted with ultra-sonic vibrations having a frequency of 40 kHz and an output force of 150 W.

Figure 6:
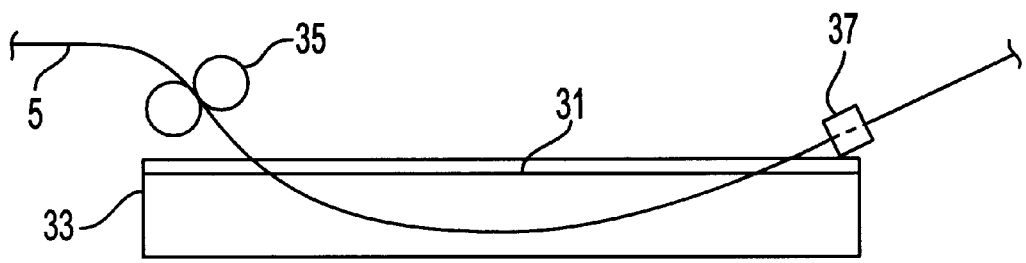
FIG. 6 shows a cladding vat provided for the apparatus for manufacturing a graded refractive-index type plastic optical fiber according to a third embodiment of the invention.

FIG. 6 shows an apparatus for manufacturing a graded refractive-index type plastic optical fiber, in which the apparatus has a cladding-formation vat according to a third embodiment. This embodiment differs from the first in that, in the cladding-formation step (S6), fiber 5 is dipped in cladding-formation vat 33 filled with a monomer 31 for cladding formation. The other features are the same as in the first embodiment.

The fiber 5 continuously arriving from drawing unit 17 (FIG. 2) is subsequently fed into cladding-formation vat 33 via feed roller 35. The fiber 5 is then withdrawn from monomer 31 and passed through a nipple 37 in order to minimize a diameter drift after soaking of the fiber. After the excess monomer 31 is removed, the monomer 31 still remaining on the surface is polymerized and hardened by curing or ultra-violet radiation. The monomer used in cladding-formation vat 33 has a refractive index lower than that of the fiber material which forms fiber 5.

As this process is not aimed at grading the refractive index, fiber 5 is preferably withdrawn from the vat 33 quickly, so that the fiber 5 is not dissolved in the monomer 31. Usually, the dipping time is less than 5 minutes.

The present embodiment gives the same effect as the first embodiment. In addition, as a cladding is formed by soaking the fiber in the cladding-formation vat 33, the cladding-formation temperature is lower than when it is formed by extrusion. Accordingly, fiber 5 can be prevented from a possible quality change or deformation due to the heat used for cladding formation. The transmission loss of the plastic optical fiber 3 obtained can thus be reduced.

A fourth embodiment differs from the third in that, in the cladding-formation vat 33, the polymer is dissolved in the same monomer as the constituent monomer of the aforementioned polymer, instead of monomer 31. The polymer used for cladding-formation has a refractive index lower than that of the fiber material for fiber 5. After dipping in the cladding-formation vat 33, the monomer in the solution adhered onto the surface of fiber 5 is polymerized and hardened by heating or ultra-violet radiation, and forms a cladding.

As in the previous embodiment, the cladding is formed without heating the fiber 5 to a high temperature. The transmission loss of the plastic optical fiber 3 can thus be reduced, as in the third embodiment.

A fifth embodiment differs from the third in that, in cladding-formation vat 33, a solution prepared by dissolving a polymer in a solvent is used, instead of using monomer 31. The polymer used has a refractive index lower than that of the fiber material 5 for fiber 5. After dipping in cladding-formation vat 33, the monomer solution adhered onto the surface of fiber 5 is dried by warm air ventilation or heating, and the solvent component in the solution is evaporated off. The remaining polymer component is solidified as residue and forms a cladding.

As in the previous case, the cladding is formed without heating the fiber 5 to a high temperature. Therefore, the transmission loss of a plastic optical fiber obtained can be reduced, as in the third embodiment.

In the third to fifth embodiments, cladding-formation step (S6) is performed after hot drawing step (S5), but the latter may be carried out prior to hot drawing step (S5).

Likewise, in the above embodiments, cladding formation by soaking is applied to the process according to the first embodiment. This cladding formation is also applicable to the process of the second embodiment.

Figure 7:
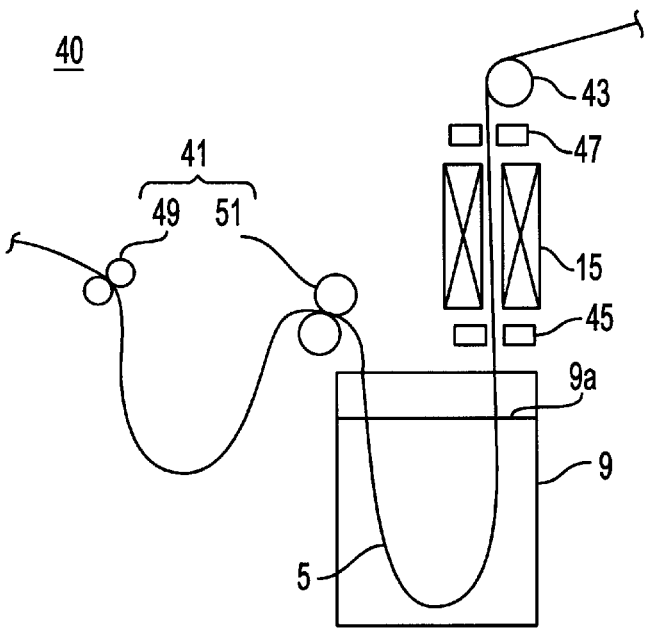
FIG. 7 shows an index grading unit in an apparatus for manufacturing a graded refractive-index type plastic optical fiber according to a sixth embodiment of the invention.

A sixth embodiment relates to a device for manufacturing a graded refractive-index type plastic optical fiber, in which the refractive-index grading unit 40 has a structure shown in FIG. 7. The same reference numbers are used as in FIG. 2 for the corresponding units. This embodiment differs from the first embodiment only in that refractive-index grading unit 40 is used, in place of refractive-index grading unit 8.

In grading unit 40, diffusion vat 9 for monomer dipping extends vertically. This vat 9 is provided with a feed unit 41 at one upper side thereof, which continuously feeds fiber into the vat 9, and with a withdrawing roller 43 at the other upper side thereof, which withdraws the fiber 5 from the vat 9. A drying and heating device 15 is installed between the diffusing vat 9 and the withdrawing roller 43. The fiber 5 is thus pulled by withdrawing roller 43 via drying and heating device 15. Also, each side of the drying and heating device 15 is provided with a first and a second gauge 45, 47 respectively, for measuring the external diameter of fiber 5.

The feed unit 41 includes a first and a second feed roller 49, 51 at two different positions of the fiber passage. The fiber 5 leaving fiber-forming unit 1 is passed through the first and second feed roller 49, 51 and fed into the monomer 9a contained in the diffusion vat 9.

The second feed roller 51 located downstream in feed unit 41 and withdrawing roller 43 have a conveying speed controlled, such that fiber 5 maintains a certain degree of looseness between the second roller 51 and the withdrawing roller 43. Thus, the fiber 5 is conveyed in a hanging state forming a U-shape. This U-shaped hanging fiber 5 is dipped into the diffusion vat 9 containing the monomer 9a.

Fiber 5 has a density greater than that of the monomer 9a, so that the U-shaped fiber 5 sinks naturally into the monomer 9a by its own weight. Further, the fiber 5 is moved onward in a manner to retain the U-shape when passing through the monomer 9a and yet not to contact the bottom of the vat 9.

The fiber 5 is withdrawn from monomer 9a by withdrawing roller 43. The fiber 5 is then successively passed through a first diameter gauge 45, drying-and-heating device 15, a second diameter gauge 47 and withdrawing roller 43.

The hanging part of fiber 5, located between the second feed roller 51 of feed unit 41 and the withdrawing roller 43, is set to have a predetermined length, so as to keep the tension exerted on the fiber 5 constant. This tension of the fiber 5 in the monomer is set to a level of less than 100 gf, preferably less than 20 gf.

The first diameter gauge 45 controls the conveying speed of the second feed roller 51 and the withdrawing roller 43, so as to keep the diameter of fiber 5 constant. If the external diameter of fiber 5, when withdrawn from the monomer, becomes larger than a determined measure, the conveying speed of rollers 51, 43 is reduced. Accordingly, the dipping duration of fiber 5 in the monomer 9a is lengthened, and the external diameter of fiber 5 is reduced. On the contrary, if the external diameter of fiber 5 becomes smaller than a determined measure, the conveying speed of rollers 51, 43 is increased, so as to increase the diameter of fiber 5. Further, the loosened fiber 5 between the first feed roller 49 and the second feed roller 51 serves to control the conveying speed of the rollers 51, 43, easily.

The second diameter gauge 47 controls the external diameter of the fiber 5 after having passed through a drying and heating unit 15. If the outer diameter of fiber 5 as the core part of a plastic optical fiber 3 is not contained within the limits of a determined range, the process of manufacturing fiber 3 is suspended.

As understood from the above, the present embodiment gives the same effects as the first embodiment. In addition, in this embodiment, fiber 5 sinks naturally into the monomer 9a by its own weight, forms a loosened U-shape, and passes through the monomer 9a in this shape. Therefore, the fiber 5 is smoothly passed through the monomer 9a following a traced route and the tension exerted on the fiber 5 by dipping in the monomer can be maintained at a level of less than 100 gf, preferably less than 20 gf. As a result, even if fiber 5 is swollen with monomer 9a, softened and rendered liable to deformation, this dipping step will not cause disorders in the distribution of refractive index. Thus, the quality of the plastic optical fiber 3 will be improved.

Also, withdrawing roller 43 pulls up fiber 5 from diffusion vat 9 via drying-and-heating unit 15. In this handling process, the steps likely to cause deformation lie between the dipping of fiber 5 in monomer 9a and the hardening of the monomer 9a, diffused in the fiber 5 or attached on the surface thereof, in drying-and-heating unit 15. By virtue of the above configuration, fiber 5 is conveyed without contacting the rollers or the like between these steps. Deformation of fiber 5 is thus safely avoided.

Further, the conveying speed of fiber 5, when passing through diffusion vat 9, is controlled on the basis of the measure effected by the first diameter gauge 45. Drift on the fiber diameter, caused by dipping, is thus safely suppressed.

In the above embodiment, refractive-index grading unit 40 is used in the process according to the first embodiment. It can also be applied to the process according to the second to fifth embodiments.

Figure 8:
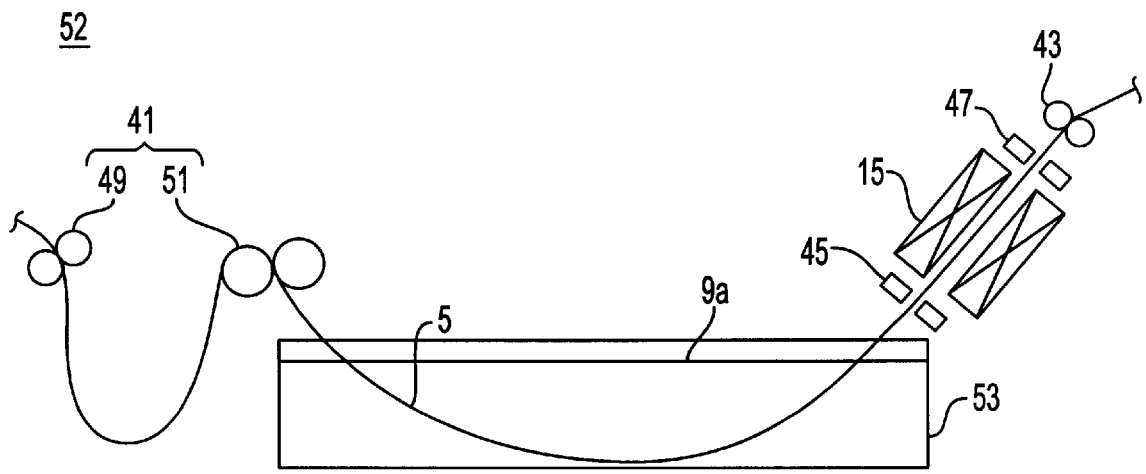
FIG. 8 shows a variation of the refractive-index grading unit of the sixth embodiment.

FIG. 8 shows a variation 52 of the refractive-index grading unit 40 represented in FIG. 7. In this unit 52, a horizontally extending vat is used instead of a vertically extending vat. Fiber 5 passes through the monomer 9a in the diffusing vat 53, along the path formed in a bow shape.

In the horizontally extending vat 53, fiber 5, conveyed by feed roller 51 and withdrawing roller 43, traverses the monomer 9a in the horizontal direction. Therefore, fiber 5 has to support its own weight to a lesser extent. As a result, the tension on the fiber 5 is reduced and the fiber 5 is prevented from rupture during dipping.

Figure 9:
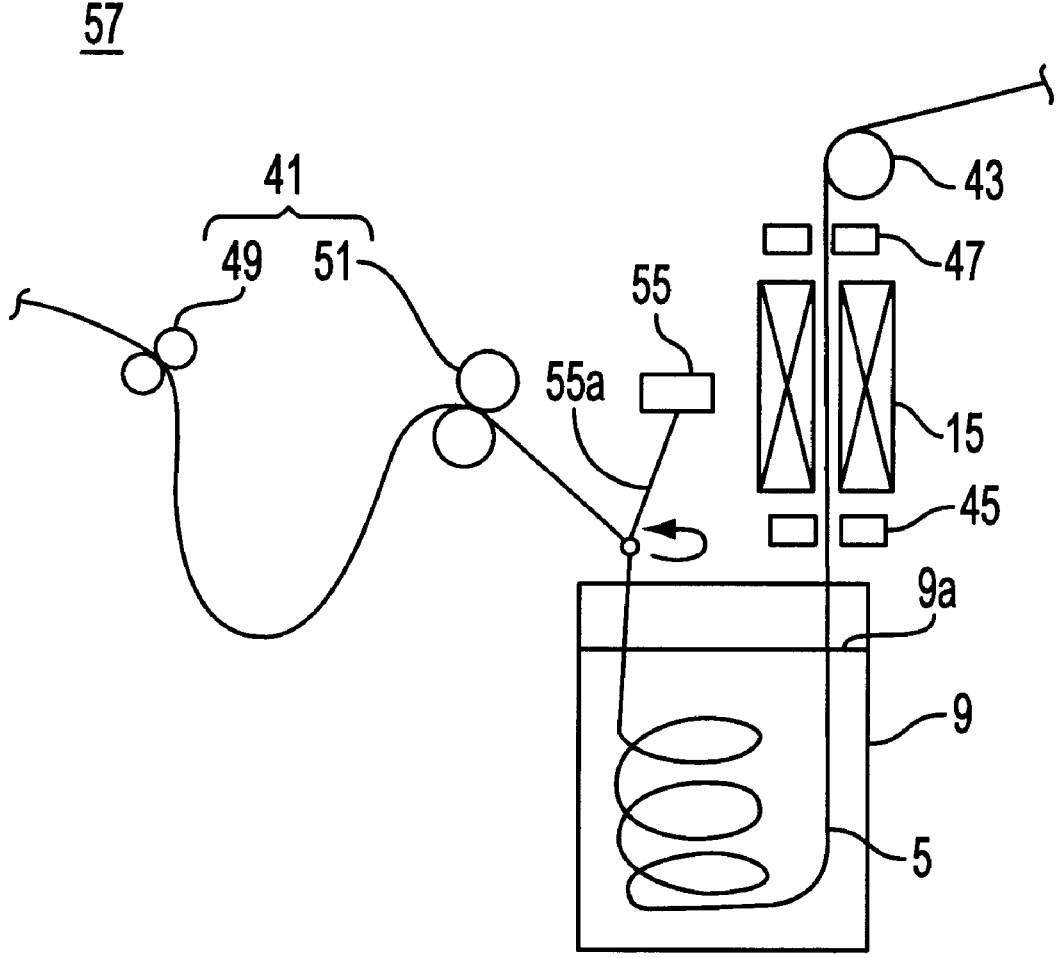
FIG. 9 shows an index grading unit in an apparatus for manufacturing a graded refractive-index type plastic optical fiber according to a seventh embodiment.

A seventh embodiment relates to a device for manufacturing a graded index type plastic optical fiber, comprising a refractive-index grading unit 57 shown in FIG. 9. This embodiment differs from the sixth embodiment in that the grading unit 57 includes a guide unit 55 for regulating dipping positions, so that fiber 5 is guided into the monomer 9a in the manner to form loops. The same reference numerals are used for the common elements.

The guide unit 55 is provided with a rotating arm 55a so as to guide fiber 5. Fiber 5 is passed through the end portion of arm 55a. When the arm 55a is rotated, the dipping position of fiber 5 into the monomer 9a is shifted, thereby forming a circle. Fiber 5 sinks into the monomer 9a by virtue of its own weight, by taking a helicoidal shape. The fiber 5 sinking in the monomer 9a is pulled up by withdrawing roller 43, before it reaches the bottom of diffusion vat 9.

In the fiber 5 passing through the monomer 9a, its free length between the second feed roller 51 in feed unit 41 and the withdrawing roller 43 is set to a constant level, so that the tension exerted on the fiber 5 is kept constant. This tension is set to a level of less than 100 gf, preferably less than 20 gf.

In the present embodiment, fiber 5 sinks into monomer 9a in spiral shape by virtue of its own weight, while keeping a determined looseness. The sunken fiber 5 is pulled up subsequently, before it reaches the bottom of diffusion vat 9. The fiber 5 is thus passed through the monomer 9a smoothly, along the predetermined path. The tension exerted on fiber 5 can be maintained at a level of less than 100 gf, preferably less than 20 gf. As the result, even if fiber 5 is swollen with the monomer, softened and rendered subject to deformation, the dipping step will not cause a disturbance in the distribution of refractive index. The quality of a plastic optical fiber is thus improved as in the case of the sixth embodiment.

As fiber 5 sinks into monomer 9a in a spiral form, the dipping time and dipped length of fiber 5 becomes longer. Thus, fiber 5 gets a better contact duration with monomer.

In the present embodiment, grading unit 57 is applied to the manufacturing process of the first embodiment. It can also be applied to the process of the embodiments 2–5.

Examples of the embodiments are shown hereinafter. Examples 1–3, examples 4–6, examples 7–9 and examples 10 and 11 correspond to embodiment 1, embodiment 2, embodiments 3–5 and embodiments 6 and 7, respectively.

EXAMPLE 1

In the fiber material preparing step, 83 parts by weight of methyl methacrylate (MMA) and 17 parts by weight of benzylbenzoate (BEN) were mixed. To this, 0.5 parts by weight of butyl peroxide (PBD) as a polymerization-initiator agent was added and mixed. After mixing, the mixture was subjected to a vacuum of 133.3 Pa (1 Torr) by pumping. When the air was sufficiently aspirated, the mixture was stirred slowly in a warm water bath at 40° C. for 48 hours under vacuum during which polymerization was initiated. The polymerization was further continued for 24 hours in a vacuum at 60° C. The polymer obtained constitutes a material for fiber 5. During the period from initiation to end of the polymerization, the reaction was performed in a vacuum.

The polymer thus obtained had a weight-average molecular weight from 120,000 to 150,000. The polymer was crushed by a micro hammer mill into a particle size of 3 mm and pelletized.

In order to homogenize the quality of difference of the pellets obtained, the pellets were carefully mixed and melted by heat. The mixture was kneaded at a constant temperature of 220° C. in heater 1b (FIG. 3), and spun into fiber 5 having a diameter of 3.4 mm.

In the unit where fiber 5 is dipped into monomer, 0.1% by weight of benzoyl peroxide as a polymerization-initiator, and 0.1% by weight of n-butyl mercaptan as a chain-transfer compound were added to monomer MMA and the total solution was put into diffusion vat 9. The temperature of the solution in the vat was set at 20° C.

Fiber 5 was run for 30 minutes in diffusion vat 9 and pulled out from the solution. The fiber 5 was then heated gradually from 50 to 80° C. in heater 15, so that the monomer either diffused inside the fiber 5 or adhered onto the surface thereof was completely polymerized and hardened. The monomer that remained in fiber 5 was found to be 3.6% of the total monomer. The diameter of fiber 5 thus obtained was 2.8 mm. Fiber 5 was then heated and drawn to obtain a diameter of 0.9 mm.

In the cladding-formation process, poly(1,1,2-trifluoroethyl methacrylate) was melted at about 120 to 130° C. and extruded around fiber 5 to form a cladding.

As a result, a plastic optical fiber 3 having a graded refractive index as shown in FIG. 10(*a*) was obtained. The fiber 3 had a diameter of 1 mm, a tensile strength at break of 90 MPa and an elongation at break of 110%. The difference Δn in refractive index between the center and the periphery of the core was 0.013. The transmission loss was 192 dB/km.

EXAMPLE 2

Example 2 differs from Example 1 in that, in order to increase Δn, diphenylsulfide, which has a high refractive index (n=1.632), was used as a non-polymerizable compound and that hot drawing is carried out after cladding formation.

In the fiber-material preparing step, 83 parts by weight of MMA and 17 parts by weight of diphenylsulfide were mixed. To this, 0.5 parts by weight of butyl peroxide (PBD) was added as a polymerization initiator and stirred. After stirring, the mixture was put under a vacuum of 133.3 Pa (1 Torr) by sucking the air out. After having removed air sufficiently, the mixture was stirred slowly in a warm water bath at 40° C. for 48 hours under vacuum, during which polymerization was initiated. The mixture was further polymerized for 24 hours under vacuum at 60° C., whereby the polymer as a material for fiber 5 was formed.

The polymer thus obtained had a weight-average molecular weight of 120,000 to 150,000. The polymer was crushed into a particle size of 3 mm by a micro-hammer mill and pelletized.

In order to homogenize the quality difference of the pellets, these were carefully mixed and melted by heat. Under a constant temperature of 220° C. in heater 1b (FIG. 3), the mixture was kneaded and spun into fiber 5 having a diameter of 3.4 mm.

In the dipping process, monomer MMA was supplemented with 0.1% by weight of benzoyl peroxide as a polymerization initiator and 0.1% by weight of n-butyl mercaptan as a chain-transfer compound and the solution was put into diffusion vat 9. The temperature of the diffusion bath was set at 20° C.

Fiber 5 was run for 30 minutes through diffusion vat 9 and pulled out from the solution. The fiber 5 was then heated gradually from 50 to 80° C. in a heater, so that the monomer diffused inside fiber 5 as well as adhered on the surface thereof was completely polymerized and hardened. The monomer remained in fiber 5 was found to be 3.7% of the total monomer.

In a subsequent cladding-formation process, poly(1,1,2-trifluoroethyl methacrylate) was melted at about 120 to 130° C. and extruded around fiber 5 to form a cladding. The diameter of fiber 5 thus obtained was 3.0 mm. This fiber 5 was then heated and drawn to give a plastic optical fiber 3 having a diameter of 1 mm.

The plastic optical fiber 3 thus drawn retained mechanical strength. According to tests, the tensile strength at break was 90 MPa and the elongation at break was 110%. Plastic optical fiber 3 has the distribution in graded refractive index as shown in FIG. 10(*b*). The difference Δn of refractive index between the center and the periphery of the core was 0.024. The transmission loss was 186 dB/km.

EXAMPLE 3

In fiber-material preparing step, 79 parts by weight of MMA, 4 parts by weight of methyl acrylate (MA) and 17 parts by weight of diphenylsulfide were mixed. To this, 0.5 parts by weight of butyl peroxide (PBD) as a polymerization initiator was added and stirred. After stirring, the mixture was put under a vacuum of 1 Torr by removing the air. After having removed the air sufficiently, the mixture was stirred slowly in a warm water bath at 40° C. for 48 hours under vacuum, during which polymerization was initiated. The mixture was further polymerized for 24 hours in an air bath at 60° C., whereby the polymer as a material for fiber 5 was formed. Vacuum was applied from the polymerization initiation stage to its end stage.

The polymer thus obtained had a weight-average molecular weight of 120,000 to 150,000. The polymer was crushed into a particle size of 3 mm by a micro-hammer mill and pelletized.

In order to homogenize the quality difference of the pellets, they were carefully mixed and melted by heat. Under a constant temperature of 220° C. in heater 1*b* (FIG. 3), the mixture was kneaded and spun into fiber 5 having a diameter of 3.4 mm.

In the dipping process, monomer MMA was supplemented with 0.1% by weight of benzoyl peroxide as a polymerization initiator and 0.1% by weight of n-butyl mercaptan as a chain-transfer compound. The solution was put into diffusion vat 9 and the temperature of the solution in diffusion vat was set at 20° C.

Fiber 5 was run for 30 minutes in diffusion vat 9 and pulled out from the solution. The fiber 5 was then heated gradually from 50 to 80° C. in a heater, so that the monomer either diffused inside the fiber 5 or adhered on the surface thereof was completely polymerized and hardened. The monomer that remained in fiber 5 was found to be 4.1% of the total monomer. The diameter of fiber 5 thus obtained was 2.8 mm. This fiber 5 was then heated and drawn to obtain a diameter of 0.9 mm.

In a cladding-formation process, poly(1,1,2-trifluoroethyl methacrylate) was melted at about 120° C. to 130° C. and extruded around the fiber 5 to form a cladding.

As the result, a plastic optical fiber having the distribution in graded refractive index shown in FIG. 10(*c*) was obtained. The diameter of the plastic optical fiber 3 was 1 mm. The tensile strength at break was 90 MPa and the elongation at break was 120%. The difference Δn a refractive index between the core center and the core periphery was 0.025. The transmission loss was 189 dB/km.

EXAMPLE 4

Example 4 differs from Example 1 in that diffusion vat 27 for dipping is equipped with a device for imparting ultrasound. In this Example, fiber 5 was run for 10 minutes through the monomer imparted with ultra-sound having a frequency of 40 kHz.

As a result, the plastic optical fiber 3 obtained had the distribution in grading refractive index as shown in FIG. 10(*a*), which is the same as that for Example 1. The plastic optical fiber 3 had a diameter of 1 mm, a tensile strength at break of 90 MPa and an elongation at break of 110%. The difference Δn of refractive index between the core center and the core periphery was 0.013. The transmission loss was 196 dB/km.

EXAMPLE 5

Example 5 differs from Example 2 in that diffusion vat 27 for dipping is equipped with a device for imparting ultrasound. In this Example, fiber 5 was run for 10 minutes through the monomer imparted with ultra-sound having a frequency of 40 kHz.

As a result, the plastic optical fiber 3 obtained had the distribution in grading refractive index as shown in FIG. 10(*b*), which is the same as that for Example 2. The plastic optical fiber 3 had a diameter of 1 mm, a tensile strength at break of 90 MPa and an elongation at break of 110%. The difference Δn of refractive index between the core center and the core periphery was 0.024. The transmission loss was 180 dB/km.

EXAMPLE 6

Example 6 differs from Example 3 in that diffusion vat 27 for dipping is equipped with a device for imparting ultrasound. In this Example, fiber 5 was run for 10 minutes through the monomer imparted with ultra-sound having a frequency of 40 kHz.

As a result, the plastic optical fiber 3 obtained had the distribution in grading refractive index as shown in FIG. 10(*c*), which is the same as that for Example 3. The plastic optical fiber 3 had a diameter of 1 mm, a tensile strength at break of 90 MPa and an elongation at break of 120%. The difference Δn of refractive index between the core center and the core periphery was 0.025. The transmission loss was 190 dB/km.

EXAMPLE 7

Example 7 differs from Example 1 in that fiber 5 is coated with a cladding by dipping it in cladding-formation vat 33.

Cladding-formation vat 33 contained monomer 2,2,2-trifluoroethyl methacrylate supplemented with 0.5% by weight of azobisisobutyronitrile as an initiator. Fiber 5 was passed through the dipping step and the heating-and-drying step to obtain a diameter of 2.8 mm. This fiber was dipped in cladding-formation vat 33 for one minute, withdrawn therefrom and irradiated with ultra-violet rays, so that the monomer on the surface of fiber 5 was polymerized and hardened. The ultra-violet rays were emitted by a mercury lamp of 80 W/cm for 30 seconds. After the irradiation, the thickness of the cladding was found to be 18 μm.

Figure 11C:
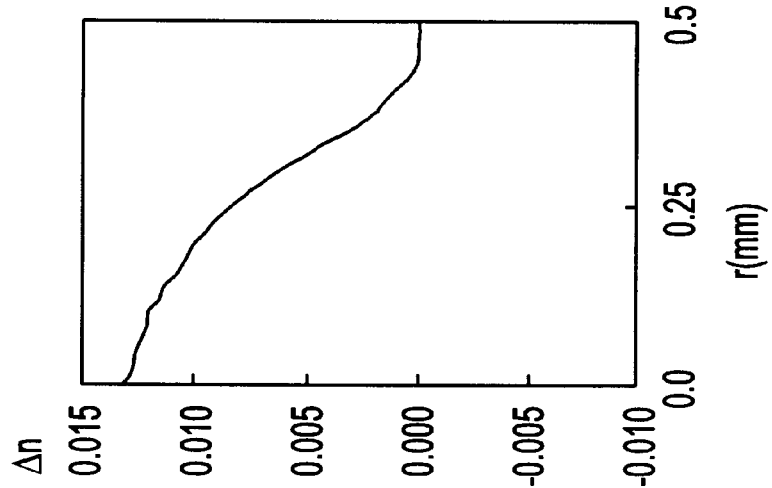
FIGS. 11(a), (b) and (c) show the distribution of a graded refractive-index in a plastic optical fiber manufactured according to the seventh, eighth and ninth embodiments, respectively.
Figure 11B:
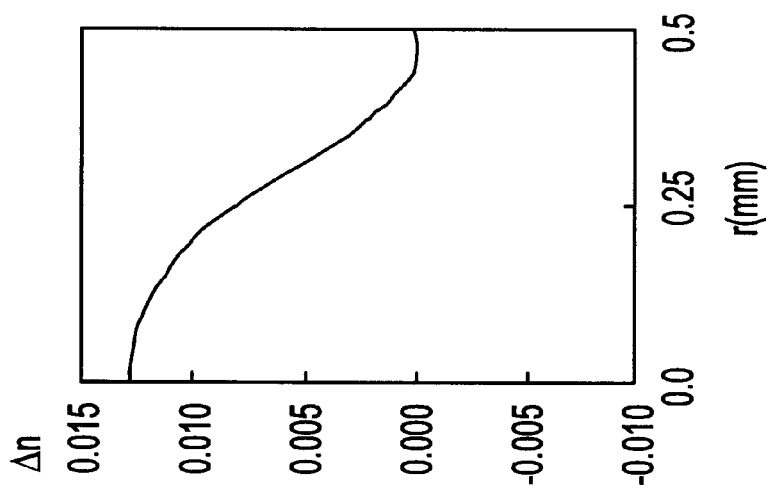
Figure 11A:
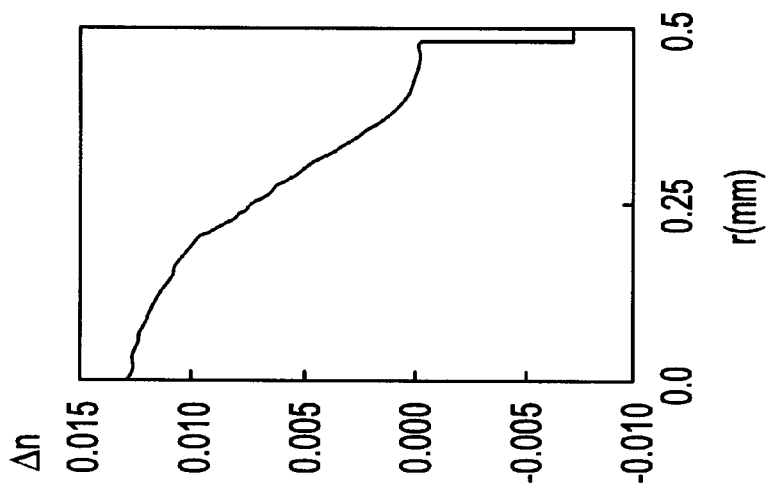

Fiber 5 was hot-drawn and formed into a plastic optical fiber 3 having a diameter of 1 mm. The plastic optical fiber 3 thus obtained had the distribution in graded refractive index as shown in FIG. 11(*a*). It had a tensile strength at break of 87 MPa and an elongation at break of 106%. The difference Δn of refractive index was 0.013 and the transmission loss was 141 dB/km. When the fiber 3 was bent with a flexion radius of 10 mm, the optical loss increased by 0.19 dB.

EXAMPLE 8

Example 8 differs from Example 1 in that cladding is formed by dipping fiber 5 in cladding-formation vat 33.

In order to prepare a solution for clad-formation vat 33, PMMA is first dissolved in monomer MMA, and 0.5% by weight of azobisisobutyronirile is then added thereto as a polymerization initiator. Fiber 5 was passed through a monomer-dipping step and a heating-and-drying step, to obtain a diameter of 2.8 mm. This fiber was soaked in a cladding-formation vat 33 for 10 seconds and pulled out therefrom. The fiber 5 was then heated, so that the monomer adhered onto the surface of fiber 5 was polymerized and hardened. Heating was carried out by passing fiber 5 through a cylindrical heater at 80° C. during five hours. Thickness of the cladding thus formed was 0.2 mm.

Fiber 5 was hot-drawn and formed into a plastic optical fiber 3 having a diameter of 1 mm. This fiber had the distribution of graded refractive index as shown in FIG. 11(*b*). Its tensile strength at break was 94 MPa and its elongation at break 107%. The difference Δn of refractive index was 0.013, while the transmission loss was 149 dB/km. When fiber 3 was bent with a flexion radius of 10 mm, the optical loss increased by 0.22 dB.

EXAMPLE 9

Example 9 differs from Example 1 in that the cladding is formed by soaking fiber 5 in cladding-formation vat 33.

In order to prepare a solution for cladding-formation vat 33, PMMA was dissolved in THF. Fiber 5 was passed through the dipping step in the monomer and the heating-and-drying step, to obtain a diameter of 2.8 mm. This fiber was soaked in cladding-formation vat 33 for 10 seconds and pulled therefrom. THF in the solution adhered onto the surface of fiber 5 was removed by heating and drying to give a cladding. Heating and drying were effected by passing fiber 5 through a cylindrical heater having a hollow passage. This hollow passage was ventilated with warm air of 50° C. at a rate of 20 l/ min for 90 minutes. After drying, the thickness of the cladding was found to be 0.18 mm.

Fiber 5 was hot-drawn and formed into a plastic optical fiber 3 having a diameter of 1 mm. This fiber had the distribution of graded refractive index as shown in FIG. 11(c). Its tensile strength at break was 90 MPa and its elongation at break was 110%. The difference Δn of refractive index was 0.013, while the transmission loss was 150 dB/km. When fiber 3 was bent with a flexion radius of 10 mm, the optical loss increased by 0.23 dB.

EXAMPLE 10

Example 10 differs from Example 1 in that the dipping step into the monomer is effected by using the grading unit 40 shown in FIG. 7.

As in Example 1 the diffusion vat 9 contained a mixture of monomer MMA, 0.1% by weight of azobisisobutyronitrile as a polymerization initiator and 0.1% by weight of n-butyl mercaptan as a chain-transfer agent. The temperature of the mixture in the vat was set to 20° C.

Fiber 5 having a diameter of 3.4 mm was manufactured according to the process described for Example 1 and fed into diffusion vat 9. This fiber was passed through monomer 9a for 20 minutes, while retaining a U-shaped looseness as mentioned above. The tension exerted on the fiber by monomer-dipping was 8 gf. When withdrawn from diffusion vat 9, fiber 5 had a diameter of 2.62 mm.

Figure 12A:
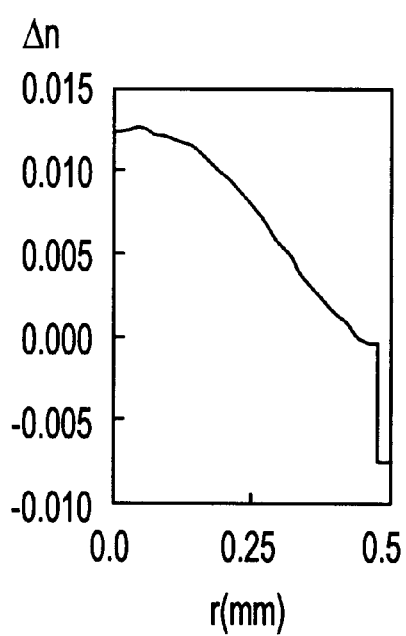
FIGS. 12(a) and (b) show the distribution of a graded refractive-index in a plastic optical fiber manufactured according to the tenth and eleventh embodiments, respectively.

As in Example 1, a plastic optical fiber 3 having a diameter of 1 mm was manufactured by the hot-drawing process and the cladding-formation process. The fiber 3 had a refractive index distribution shown in FIG. 12(a). Its tensile strength at break was 87 MPa while its elongation at break was 116%. The difference Δn of refractive index was 0.013 and the transmission loss was 187 dB/km. There was no disorder in the refractive index distribution along the longitudinal direction of the fiber.

EXAMPLE 11

Example 11 differs from Example 2 in that grading unit 57 shown in FIG. 9 is used for dipping step.

As in Example 2, diffusion vat 9 contained monomer MMA, 0.1% by weight of azobisisobutyronitrile as a polymerization initiator and 0.1% by weight of n-butyl mercaptan as a chain-transfer agent. The temperature of the solution was set to 20° C.

A fiber 5 having a diameter of 3.4 mm was manufactured according to the process described for Example 2 and fed into diffusion vat 9. This fiber was sunk in monomer 9a in loops during 20 minutes. The tension exerted on fiber 5 by monomer-dipping was 12 gf When withdrawn from diffusion vat 9, fiber 5 had a diameter of 2.58 mm.

Figure 12B:
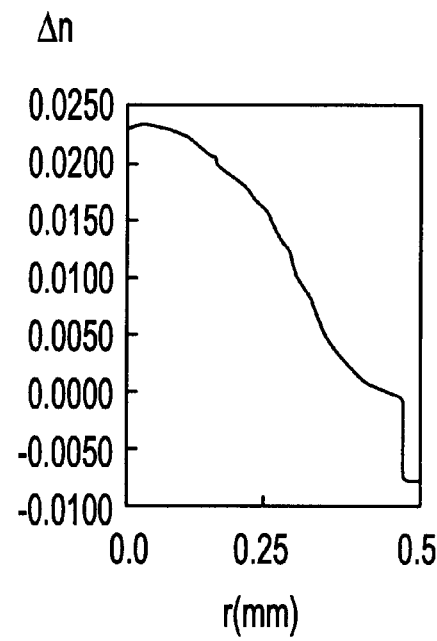

As in Example 2, a plastic optical fiber 3 having a diameter of 1 mm was manufactured by the hot-drawing and the cladding-formation processes. The fiber 3 had a refractive index distribution shown in FIG. 12(b). Its tensile strength at break was 92 MPa while its elongation at break was 108%. The difference Δn of refractive index was 0.024 and the transmission loss was 185 dB/km. There was no disorder in the refractive index distribution along the longitudinal direction of the fiber.

Three comparative examples are described hereinafter. The first, second and third comparative examples correspond to Examples 1 and 4, Examples 2 and 5 and Examples 3 and 6, respectively.

Comparative Example 1 differs from Example 1 only in that dipping duration in diffusion vat 9 was shortened from 30 minutes to 10 minutes. Otherwise, the same material and process was used to form a plastic optical fiber 3 having a diameter of 1 mm. The fiber 3 had a refractive index distribution shown in FIG. 13(a). The tensile strength at break was 90 MPa, while the elongation at break was 110%. The difference Δn of refractive index was 0.013 and the transmission loss was 195 dB/km.

Comparative Example 2 differs from Example 2 only in that dipping duration in diffusion vat 9 was shortened from 30 minutes to 10 minutes. Otherwise, the same material and process was used to form a plastic optical fiber 3 having a diameter of 1 mm. The fiber 3 had a refractive index distribution shown in FIG. 13(b). The tensile strength at break was 90 MPa, while the elongation at break was 110%. The difference Δn of refractive index was 0.024 and the transmission loss was 191 dB/km.

Comparative Example 3 differs from Example 3 only in that dipping duration in diffusion vat 9 was shortened from 30 minutes to 10 minutes. Otherwise, the same material and process was used to form a plastic optical fiber 3 having a diameter of 1 mm. The fiber 3 had a refractive index distribution shown in FIG. 13(c). The tensile strength at break was 90 MPa, while the elongation at break was 120%. The difference Δn of refractive index was 0.025 and the transmission loss was 184 dB/km.

Figure 10C:
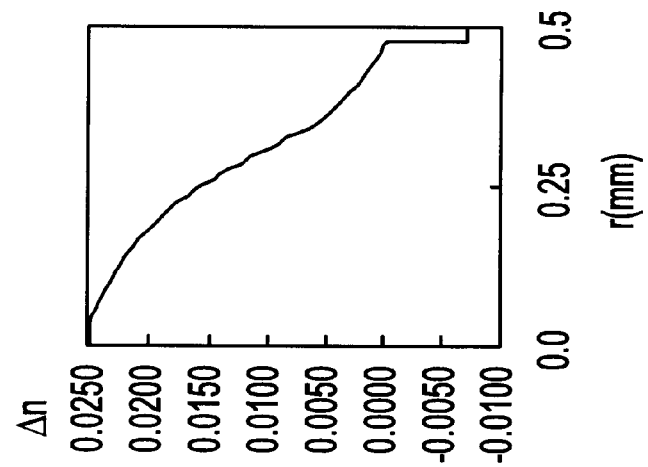
FIGS. 10(a), (b) and (c) show the distribution of a graded refractive index in a plastic optical fiber manufactured according to the first and fourth embodiments, the second and fifth embodiments and the third and sixth embodiments, respectively.
Figure 10B:
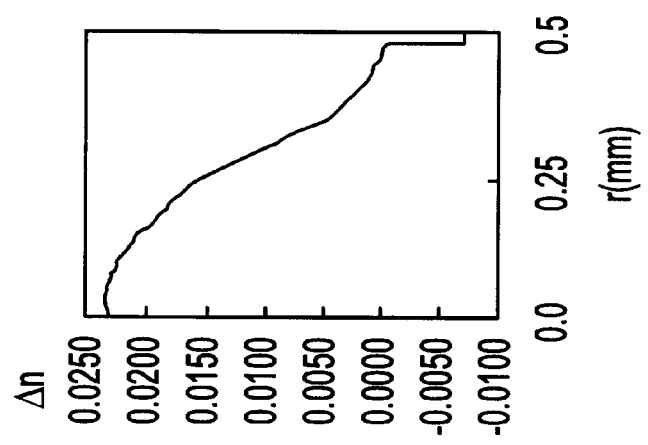
Figure 10A:
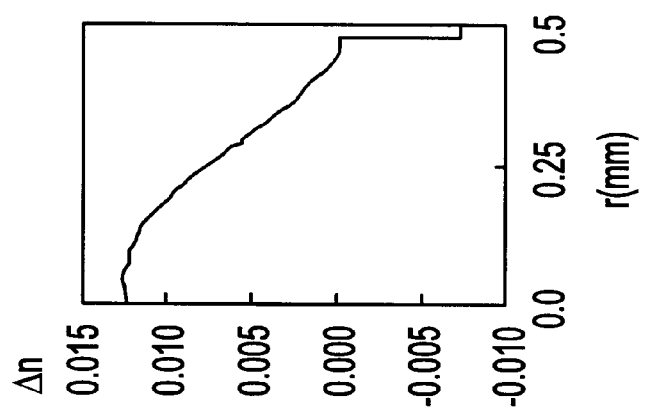

When compared with Comparative Examples 1–3, Examples 1–3 give a bi-dimensional distribution of refractive index as shown in FIGS. 10(a)–10(c). In comparison, in Comparative Examples 1–3, the refractive index distribution becomes flat at the center of fiber 5, shown in FIGS. 13(a) and 13(b). This is due to an insufficient diffusion of non-polymerizable compound inside the fiber 5. The dipping time in the monomer was therefore not enough.

In Comparative Examples 1–3 on the one hand, and Examples 4–6 on the other, the same dipping time of fiber 5 into the monomer was applied. However, in the latter, dipping was performed under the imparting of ultrasound. By virtue of this, though dipping time was short, a bi-dimensional refractive index distribution was obtained, as shown in FIGS. 10(a)–10(c).

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 9-52978 filed on Mar. 7, 1997, which is herein expressly incorporated by reference in its entirety.

What is claimed:

1. A method of manufacturing a graded refractive-index plastic optical-fiber, said method comprising:

preparing a base polymer, a non-polymerizable compound having a refractive index higher than that of said base polymer, and a polymerizable compound which is diffusible in said polymer;

mixing said base polymer and said non-polymerizable compound, thereby obtaining a fiber material;

melting and spinning said fiber material, thereby obtaining a fiber having a center portion and a periphery;

dipping said fiber in said polymerizable compound, whereby said non-polymerizable compound and said polymerizable compound diffuse inside said fiber; and heating said fiber, whereby said polymerizable compound is polymerized and said refractive index is graded decreasingly from said center portion to said periphery.

2. The method according to claim 1, wherein said fiber material if formed by:

mixing at least one first monomer and a non-polymerizable compound;

polymerizing said at least one first monomer, thereby obtaining said base polymer mixed with said non-polymerizable compound; and pelletizing said base polymer, thereby obtaining said fiber material.

3. The method according to claim 1, wherein said dipping is carried out in conjunction with ultrasonic vibrations.

4. The method according to claim 1, wherein said base polymer is formed from at least one monomer selected from the group consisting of acrylates, methacrylates, styrene-based compounds, fluoroacrylates and fluoromethacrylates.

5. The method according to claim 1, wherein said non-polymerizable compound has a refractive index higher than that of said base polymer by at least 0.02.

6. The method according to claim 1, wherein said non-polymerizable compound is at least one compound selected from the group consisting of hexyl acetate, benzyl benzoate, bis-(2-methylhexyl) phthalate, dibutyl sebacate, dihexyl adipate, dimethyl phthalate and diphenyl sulfide.

7. The method according to claim 1, wherein said polymerizable monomer is the same monomer as the one which constitutes said base polymer.

8. The method according to claim 1, further comprising:

drawing said fiber, thereby obtaining an orientation in said fiber; and forming a cladding around said fiber.

9. The method according to claim 8, wherein said cladding is formed by dipping said fiber in a second monomer capable of producing a polymer having a refractive index lower than that of said fiber material, thereby obtaining said fiber covered with said second monomer, and polymerizing said second monomer, thereby forming said cladding.

10. The method according to claim 8, wherein said second monomer is selected from the group consisting of fluoroacrylates and fluoromethacrylates.

11. The method according to claim 8; wherein said cladding is formed by:

preparing a solution of a third monomer containing a polymer deriving from said third monomer and having a refractive index lower than that of said fiber material;

dipping said fiber into said solution, thereby obtaining said fiber covered with said solution; and polymerizing said third monomer, thereby forming said cladding.

12. The method according to claim 8, wherein said cladding is formed by:

preparing a solvent containing a polymer having a refractive index lower than that of said fiber material dipping said fiber into said solvent, thereby obtaining said fiber covered with said solvent; and evaporating said solvent, thereby forming said cladding.

13. A device for manufacturing a graded refractive-index plastic optical-fiber, said device comprising:

a fiber-preparing mechanism comprising a unit for mixing a base polymer and a non-polymerizable compound having a higher refractive index than that of said base polymer to obtain a fiber material, a unit for heating and melting said fiber material to obtain a melt, and a unit for spinning said melt to continuously form a fiber;

a diffusion device comprising a container unit for containing a polymerizable compound which is diffusible in said fiber and a handling unit for passing said fiber leaving said fiber-preparing mechanism continuously into said container unit; and a curing unit for polymerizing said polymerizable compound.

14. The device according to claim 13, wherein said handling unit comprises a feed mechanism to continuously feeding said fiber into said container unit and a withdrawing mechanism for withdrawing said fiber therefrom, such that said fiber retains a loosely hanging portion between said feed mechanism and said withdrawing mechanism such that said hanging portion is dipped in and passed through said polymerizable compound.

15. The device according to claim 13, wherein said handling unit comprises a pair of feed mechanisms positioned such that a portion of said fiber hangs loosely therebetween.

16. The device according to claim 14, wherein said feed mechanism further comprises a guide unit for rotating said hanging portion, such that said hanging portion forms loops inside said polymerizable compound and such that said withdrawing mechanism withdraws said hanging portion therefrom before it reaches the bottom of said diffusion device.

* * * * *

UNITED STATES PATENT AND TRADEMARK OFFICE
CERTIFICATE OF CORRECTION

PATENT NO. : 6,013,205
DATED : January 11, 2000
INVENTOR(S) : T. NAKAMURA

It is certified that error appears in the above-identified patent and that said Letters Patent is hereby corrected as shown below:

At column 18, line 14 (claim 13, line 1) of the printed patent, after "refractive-index" insert ---type---.

At column 18, line 32 (claim 14, line 3) of the printed patent, "feeding" should be ---feed---.

Signed and Sealed this

Twentieth Day of March, 2001

Attest:

NICHOLAS P. GODICI

Attesting Officer    Acting Director of the United States Patent and Trademark Office